(12) United States Patent
Haertel et al.

(10) Patent No.: US 7,841,183 B2
(45) Date of Patent: Nov. 30, 2010

(54) METHOD AND APPARATUS FOR DELIVERING A LIQUID

(75) Inventors: Carlos Jimenez Haertel, Munich (DE); Stefan Oesterle, Turgi (DE); Carsten Reumschuessel, Grenzach-Wyhlen (DE); Sasha Savic, Wettingen (CH)

(73) Assignee: Alstom Technology Ltd, Baden (CH)

( * ) Notice: Subject to any disclaimer, the term of this patent is extended or adjusted under 35 U.S.C. 154(b) by 958 days.

(21) Appl. No.: 11/542,235

(22) Filed: Oct. 4, 2006

(65) Prior Publication Data

US 2009/0226295 A1 Sep. 10, 2009

Related U.S. Application Data

(63) Continuation of application No. PCT/EP2005/051521, filed on Apr. 6, 2005.

(30) Foreign Application Priority Data

Apr. 10, 2004 (DE) .................. 10 2004 017 682

(51) Int. Cl.
*F02C 3/00* (2006.01)
(52) U.S. Cl. .................. 60/775; 60/39.53; 60/39.3; 417/3
(58) Field of Classification Search ............ 60/785, 60/39.53, 39.55, 734, 39.3; 417/7, 8, 3
See application file for complete search history.

(56) References Cited

U.S. PATENT DOCUMENTS 3,135,282 A * 6/1964 Gray .................. 417/4
3,294,023 A * 12/1966 Martin-Vegue, Jr. et al. ... 417/7
3,744,932 A   7/1973 Prevett
3,792,317 A * 2/1974 Laks .................. 417/7

(Continued)

FOREIGN PATENT DOCUMENTS

DE     25 49 790 A1     5/1977

(Continued)

OTHER PUBLICATIONS

Form PCT/ISA/210 [International Search Report dated Jul. 27, 2005 (with English translation of category of cited documents)].

(Continued)

*Primary Examiner*—Ted Kim
(74) *Attorney, Agent, or Firm*—Buchanan Ingersoll & Rooney PC

(57) ABSTRACT

A method of operating a delivery apparatus and a delivery apparatus are disclosed for the continuous delivery of a liquid. The method and the apparatus are suitable in particular for use in a water injection system for injecting water into a main flow of a gas turbine. The delivery apparatus includes a plurality of delivery devices connected parallel to one another. In a first method step, the delivery devices of the delivery apparatus are assigned to at least two delivery device groups. The delivery device groups with the respectively assigned delivery devices are then switched to the active state from the rest mode in a rolling manner in time segments in order to deliver the liquid mass flow. In each case at least one delivery device is therefore operated in the rest mode in a rolling sequence per time segment.

14 Claims, 3 Drawing Sheets

U.S. PATENT DOCUMENTS

| | | | |
|---|---|---|---|
| 4,897,022 A * | 1/1990 | Hudson | 417/7 |
| 4,951,475 A | 8/1990 | Alsenz | |
| 5,789,879 A * | 8/1998 | Cook | 417/4 |
| 5,970,728 A | 10/1999 | Hebert | |
| 6,185,946 B1 | 2/2001 | Hartman | |
| 6,419,454 B1 | 7/2002 | Christiansen | |
| 2007/0000229 A1 * | 1/2007 | Bevilacqua et al. | 60/39.182 |

FOREIGN PATENT DOCUMENTS

| | | |
|---|---|---|
| DE | 28 50 589 A1 | 6/1980 |
| EP | 1 203 866 A2 | 5/2002 |
| FR | 1.563.749 | 3/1969 |
| JP | 10-84318 A | 3/1989 |
| JP | 2002-201958 A | 7/2002 |
| WO | 2004/111413 A1 | 12/2004 |

OTHER PUBLICATIONS

Japanese Office Action dated Jun. 15, 2010 in the corresponding Japanese Patent Application No. 2007-506777 and English-language translation.

* cited by examiner

METHOD AND APPARATUS FOR DELIVERING A LIQUID

RELATED APPLICATIONS

This application is based on and claims priority under 35 U.S.C. §119 to German Application No. 10 2004 017 682.5, filed Apr. 10, 2004 and is a continuation application under 35 U.S.C. §120 of International Application No. PCT/EP2005/051521, filed Apr. 6, 2005 designating the U.S., the entire contents of both of which are hereby incorporated by reference.

BACKGROUND

Gas turbosets, such as, for example, stationary gas turbines and also mobile gas turbines, can be optimized with regard to both the efficiency and the output. Modern gas turbosets therefore normally can have very small output reserves stretching beyond the rated output.

In order to increase the output beyond the rated output, water or another suitable liquid can be introduced into the compressor flow of the gas turbine by injection or spraying. The increase in output achieved as a result is accounted for by the fact that the liquid vaporizes after the spraying, as a result of which heat is extracted from the air flowing through the compressor. This vaporizing process taking place continuously constitutes, as it were, continuous intermediate cooling of the compressor flow and this means that, in order to compress the compressor flow to a predetermined level, less compressor work has to be done than would be necessary without the introduction of water. At the same time, the air mass flow rate through the compressor is increased. Thus, at an approximately constant combustion chamber outlet temperature, a higher output can be converted in the turbine of the gas turbine and used, for example, as shaft output.

Such spraying or injection of water for increasing the output of a gas turbine is known, for example, from Patent DE 25 49 790 or also FR 1 563 749.

The spraying or injection of water may be effected upstream of the compressor or else also in one of the compressor stages. For reasons of simplicity and efficiency, pressure atomizer nozzles are often used for spraying the water, in addition to atomizer nozzles assisted by an auxiliary medium, such as air-assisted atomizer nozzles for example. Demineralized water is normally sprayed or injected, which is pumped from a supply tank by means of one or more pumps and fed to the atomizer nozzles. To this end, the pumps deliver a relatively small mass flow of the water to be introduced at a high pressure. Centrifugal pumps are unsuitable for this mode of operation, since, at the operating points required, said centrifugal pumps either cannot be operated at all or can only be operated at a very poor efficiency. Therefore piston pumps are mostly used here. However, piston pumps have to be serviced frequently on account of the high mechanical loads acting on them and therefore have only a relatively short service life. The risk of an unforeseen failure of one or more of the piston pumps is also very high. Consequently, modern gas turbines which are designed with water injection frequently have to be shut down or at least operated without output-increasing water injection in order to be able to service or exchange the pumps.

SUMMARY

Exemplary embodiments described herein can increase the service life of delivery apparatuses with which a liquid which is to be introduced into a main flow is delivered.

Exemplary embodiments can service the pumps without having to interrupt the operation of the delivery apparatus. In a further aspect, the possibility of being able to continue operating the delivery apparatus in the event of failure of a pump can be provided.

BRIEF DESCRIPTION OF THE DRAWINGS

Exemplary embodiments are explained in more detail below with reference to the figures. In the drawings.

Figure 1:
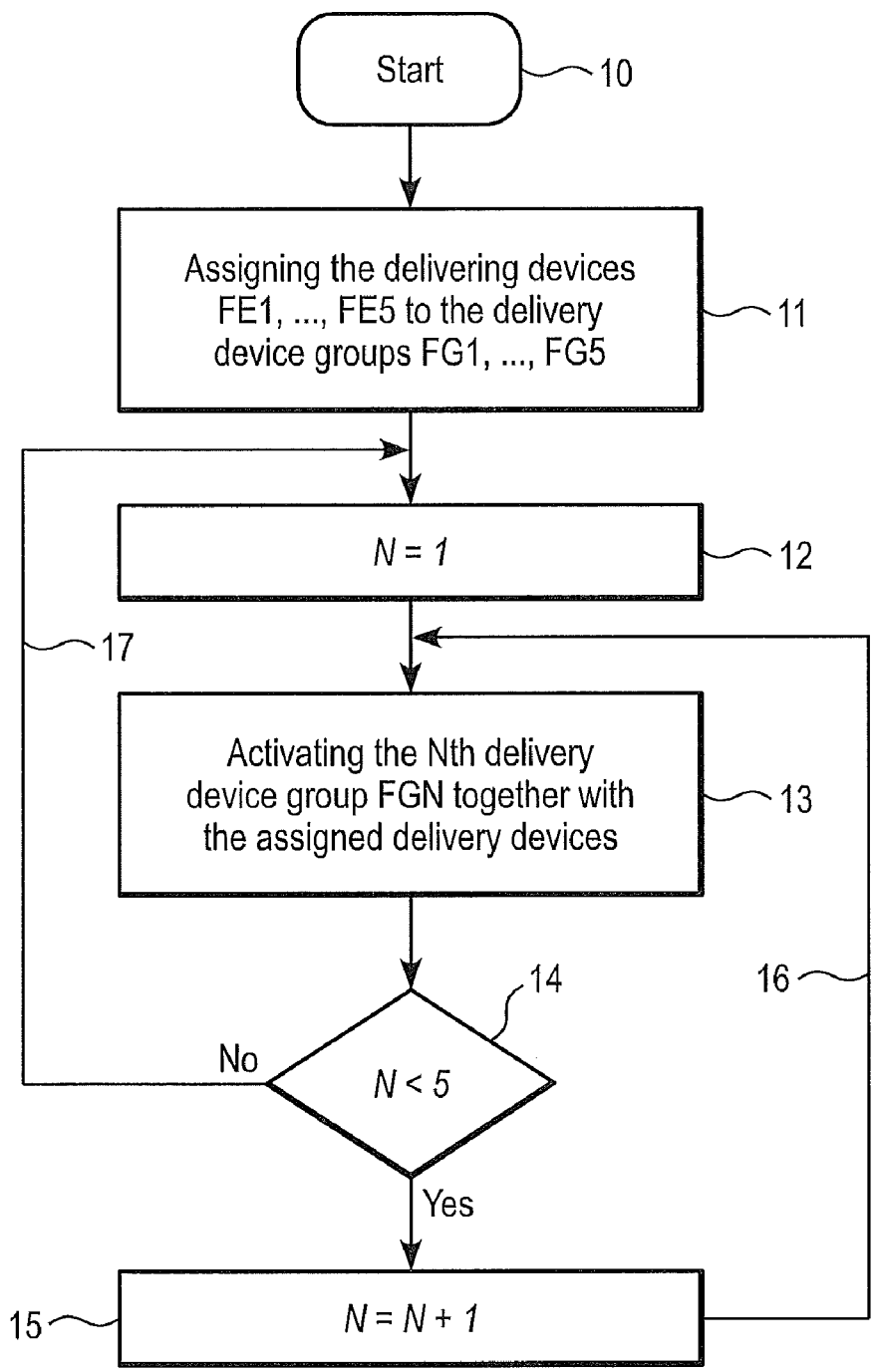
FIG. 1 shows an embodiment of the method according to the invention as a flow diagram.

Only the elements and components essential for the understanding of the invention are shown in the figures.

The exemplary embodiments shown are to be understood purely instructively and are intended to serve for better understanding, but are not to be understood as a restriction to the subject matter of the invention.

DETAILED DESCRIPTION

An exemplary method disclosed herein serves to operate a delivery apparatus with which a liquid mass flow is delivered continuously from a feed line into a delivery line. To this end, the delivery apparatus comprises a plurality of delivery devices which are connected parallel to one another. The expression "connected parallel to one another" means that liquid can be delivered from the feed line into the delivery line by means of each of the delivery devices independently of the other delivery devices. A delivery device may in this case also comprise a plurality of delivery elements connected in series, for example pumps. According to the method, the delivery devices are assigned to at least two delivery device groups. To deliver the liquid mass flow, the delivery device groups with the respectively assigned delivery devices are switched to the active state from the rest mode in a rolling manner in time segments, so that in each case at least one delivery device is operated in the rest mode in a rolling sequence per time segment. Owing to the fact that at least one delivery device is operated in the rest mode, for example a standby mode, per time segment, the service life of the delivery apparatus is prolonged. The service life of the delivery apparatus is therefore no longer limited by the service life of the individual delivery devices, but rather can be prolonged beyond the service life of the individual delivery devices.

Furthermore, a delivery device can be serviced and/or exchanged in the time segment in which this delivery device is operated in the rest mode. It is therefore possible to operate the delivery apparatus in a lasting manner without having to shut off the delivery apparatus for servicing individual delivery devices.

It has been found that it can be especially expedient to apply the method to a delivery apparatus with which a liquid mass flow is continuously delivered in order to introduce the liquid mass flow into a main flow of a gas turboset. In an exemplary embodiment of the delivery apparatus, the liquid mass flow is in this case introduced into an inlet flow of a compressor of the gas turboset. An exemplary advantage of the application of the method to such a delivery apparatus is that the operating period of the delivery apparatus need no longer be limited by the service life of the individual delivery devices. The delivery apparatus can therefore be operated for a longer period. It is also no longer necessary to shut down the delivery apparatus for servicing and/or for exchanging the delivery devices. The servicing and/or the exchange of the delivery devices can advantageously be carried out in succession during the continuous operation of the delivery apparatus, in each case while the delivery device concerned is being operated in the rest mode.

Each of the delivery devices expediently comprises at least one pump. On account of the operating characteristic required, piston pumps can be used here.

Within a respective delivery device, however, a plurality of pumps or even other delivery elements may also be connected in series.

In an advantageous embodiment, the delivery device groups with the respectively assigned delivery devices can be switched to the active state from the rest mode individually one after the other in each case at the start of a time segment in order to delivery the liquid mass flow and are switched to the rest mode again at the end of the time segment. Alternatively, the delivery device groups with the respectively assigned delivery devices can be switched to the active state from the rest mode in a plurality of groups one after the other in each case at the start of a time segment in order to deliver the liquid mass flow and can be switched to the rest mode again at the end of the time segment. A change may also be carried out between the two switching variants during the operation of the switching apparatus. Thus, for example, the delivery device groups can first of all be activated individually, as a result of which only in each case a number of delivery devices assigned to the respective delivery device group are activated to begin with in order thus to deliver a certain liquid mass flow. If the liquid mass flow delivered is now to be increased, groups of, for example, in each case two delivery device groups can be formed for the further operation of the delivery apparatus, said groups then being jointly activated. Accordingly, in each case all the delivery devices which are assigned to the jointly activated delivery device groups can then be activated.

The time segments can be selected to be the same length. Firstly, this ensures uniform loading of all the delivery devices with respect to time. Secondly, when time segments of the same length are selected, monitoring of the active operating time covered by each delivery device is possible in a simple manner by summation of the time segments covered.

In an alternative embodiment of the method, however, it may also be expedient to select time segments of different length. This is especially appropriate when the loads of the delivery device groups or of the delivery elements vary. The time intervals are then advantageously selected in such a way that an overall load identical for all the delivery elements occurs. However, this can make it desirable to monitor, store and evaluate the respective operating and load states for at least one delivery device of each delivery device group of the delivery apparatus.

In an advantageous development of the method, the number of delivery device groups and/or the number of delivery devices per delivery device group and/or the assignment of the delivery devices to the delivery device groups can be established as a function of the liquid mass flow to be delivered. This can be done at the start of the operation of the delivery apparatus. However, if the liquid mass flow is changed, it may be expedient for the number of delivery device groups and/or the number of delivery devices per delivery device group and/or the assignment of the delivery devices to the delivery device groups to be established again with respect to the liquid mass flow even during the operation of the delivery apparatus.

In an advantageous configuration of the method, at least one of the delivery devices can be assigned to a plurality of delivery device groups. Each delivery device of the delivery apparatus can be assigned to at least two delivery device groups. By the delivery devices being assigned to a plurality of delivery device groups, the outlay in terms of equipment can be reduced owing to the fact that fewer delivery devices overall are provided than are assigned in total to the delivery device groups.

In a further expedient development of the method, the delivery apparatus comprises N delivery devices, the N delivery devices of the delivery apparatus being assigned to N delivery device groups with in each case N−1 delivery devices. If a respective delivery device group is now switched to the active state in a rolling manner, a respective delivery device is likewise in the rest mode in a rolling sequence. If the delivery apparatus is operated in this way, the service life of the delivery devices is prolonged at least by the Nth part of the individual service life of an individual delivery device. If the rest modes are used for servicing or exchanging the respective delivery device, the delivery apparatus can also be operated in a lasting manner without interruption.

According to a further advantageous embodiment of the method, the liquid mass flow to be delivered is determined from a setpoint output selection of the gas turboset. A change in the liquid mass flow to be delivered can also be expediently effected via a change in the delivery outputs of the delivery devices.

Furthermore, activation of the atomizing elements or of the atomizing element groups via which the liquid mass flow is introduced into the main flow, such as, for example, the turning on or off of the atomizing elements or of the atomizing element groups, is expediently regulated in synchronism with the delivery outputs of the delivery devices. The control is expediently effected by means of a central controller of the delivery apparatus.

However, the method can also be used in order to ensure a higher degree of operating reliability against the failure of one or more delivery devices. In this case, in the event of unforeseen failure of one or more delivery devices, that delivery device group to which the failed delivery device or the failed delivery devices is/are not assigned is switched to the active state.

In a further aspect, a delivery apparatus is provided for the continuous delivery of a liquid mass flow which is to be introduced into a main flow of a gas turboset. In an exemplary embodiment, the liquid mass flow delivered is introduced into an inlet flow of a compressor of the gas turboset. To this end, the delivery apparatus comprises a feed line, a delivery line, a plurality of delivery devices for delivering the liquid mass flow from the feed line into the delivery line, and at least one atomizing element communicating with the delivery line. The delivery devices can be arranged parallel to one another. Furthermore, the exemplary delivery apparatus comprises a means for assigning the delivery devices to at least two delivery device groups and a means for the rolling activation of the delivery device groups with the respectively assigned delivery devices in time segments.

The liquid used for spraying into a main flow of a compressor can be demineralized water. In addition to water, however, the liquid used may also be a mixture of water and a further additive or also another suitable liquid.

The expression "introduction of a liquid" refers both to spraying or atomizing of the liquid and to injection of the liquid into a main flow.

The injection of the liquid into the main flow is in this case effected non-intermittently, i.e. continuously. The atomizing element accordingly does not comprise any closure means for closing a passage opening of the atomizing element, through which passage opening the liquid is introduced into the main flow from the atomizing means.

Such closure means are known from the prior art in order to be able to intermittently open the passage opening and close it again in order thus to introduce the liquid intermittently into the main flow.

Each delivery device can expediently comprise at least one pump. On account of their operating characteristic, piston pumps are especially suitable for use as delivery devices. By means of piston pumps, it is possible to deliver a relatively small mass flow of the liquid at a high pressure. A high pressure of the liquid in the feed line can therefore be realized. In particular in the case of pressure atomizers, a high supply pressure of the liquid in the feed line is necessary in order to achieve a good atomized quality of the liquid.

According to an advantageous configuration of the delivery apparatus, the means for assigning the delivery devices to the at least two delivery device groups and the means for the rolling activation of the delivery device groups with the respectively assigned delivery devices in time segments are integrated in a controller of the delivery apparatus.

In an expedient development, the delivery apparatus furthermore comprises at least one restrictor element, the restrictor element being arranged in the delivery line between the delivery devices and the at least one atomizing element.

The at least one restrictor element is advantageously controlled by means of the controller of the delivery apparatus.

Furthermore, the delivery apparatus expediently comprises a plurality of atomizing element groups having at least one respective atomizing element. Each atomizing element group is connected to the delivery line via an individual delivery line. Furthermore, a restrictor element can be arranged in each individual delivery line between the delivery line and the at least one atomizing element of the atomizing element group.

In an exemplary configuration, the at least one atomizing element is designed as a pressure atomizer nozzle.

Alternatively, however, the at least one atomizing element may also be designed as a nozzle assisted by an auxiliary medium, for example as an air-assisted nozzle, as an "airblast nozzle". If the delivery apparatus comprises a plurality of nozzles, these nozzles can be all of one type of design.

In a further expedient configuration, the atomizing nozzles can be arranged on a nozzle carrier. However, a plurality of nozzle carriers may also be provided, on which the atomizing elements are arranged in a distributed manner.

The delivery apparatus can be operated in an especially expedient manner according to the above described method.

An exemplary method is shown as a flow diagram in FIG. 1. The method serves to operate a delivery apparatus, the delivery apparatus considered here comprising five delivery devices. Here, each delivery device comprises only one respective piston pump. In principle, however, a plurality of pumps may also be provided inside a delivery device and be connected, for example, in series. The delivery devices are connected parallel to one another, i.e. each delivery device communicates directly on the feed side with a feed line of the delivery apparatus and on the delivery side with a delivery line of the delivery apparatus.

The method shown in FIG. 1 is subdivided essentially into two central method steps. After the method has been started (method step 10 in FIG. 1), the five delivery devices FE1, FE2, FE3, FE4 and FE5 of the delivery apparatus are assigned to five delivery device groups FG1, FG2, FG3, FG4 and FG5 in method step 11. Four delivery devices are assigned to each delivery device group FG1, FG2, FG3, FG4 and FG5. Thus, for example, the delivery devices FE1, FE2, FE3 and FE4 are assigned to the first delivery device group FG1, the delivery devices FE2, FE3, FE4 and FE5 are assigned to the second delivery device group FG2, the delivery devices FE3, FE4, FE5 and FE1 are assigned to the third delivery device group FG3, the delivery devices FE4, FE5, FE1 and FE2 are assigned to the fourth delivery device group FG4, and the delivery devices FE5, FE1, FE2 and FE3 are assigned to the fifth delivery device group FG5.

After the delivery devices have been assigned to the delivery device groups, a counting variable N is set at 1 (method step 12 in FIG. 1). In a further method step 13, the delivery device groups FG1 to FG5 with the respectively assigned delivery devices are switched to the active state from a rest mode in a rolling manner in time segments. In accordance with the counting variable N, in each case the Nth delivery device group with the respectively assigned delivery devices is switched to the active state from the rest mode at the start of the time segment and is switched to the rest mode again at the end of the time segment. After the end of the time segment, first of all the current counting value of the counting variable N is checked (method step 14). If the counting variable N is less than 5, the counting variable N is increased by 1 (method step 15). After that, a return 16 to method step 13 is effected and the method step 13 is followed again. However, if the counting variable N has already reached the value 5, the counting variable N is set back again to the value 1 by the return 17 to method step 12. The method step 13 is then followed again on the basis of the set-back counting variable N.

The liquid mass flow is therefore delivered in a rolling manner in each case by means of those delivery devices which are assigned to the delivery device group switched to the active state for the respective time segment. At the same time, this means that a delivery device is in each case in the rest mode in a rolling sequence at each time segment. In the exemplary embodiment shown in FIG. 1, this is in each case that delivery device FE1 to FE5 which is not assigned to the respectively active delivery device group FG1 to FG5.

The time segments are expediently selected to be the same length. In order to realize time control with in each case time segments of equal length, only one time counting unit is necessary as controller. Furthermore, equally distributed loading of the delivery devices is ensured in this way in good approximation. As an alternative to this, the loads of the delivery devices can also be detected by measurement, stored and evaluated with the aim of determining individual time segments while preselecting an equal distribution of the load of the delivery devices.

The method shown in FIG. 1 can be applied in an especially expedient manner for operating a delivery apparatus with which a liquid mass flow is continuously delivered in order to introduce the liquid mass flow into a main flow of a gas turboset in a non-intermittent mode of operation. The liquid mass flow can be introduced into an inlet flow of a compressor of the gas turboset. The delivery apparatus can consequently be designed as part of the gas turbine plant. It will therefore often be expedient to control the delivery apparatus via a central control unit of the gas turbine plant.

Owing to the fact that at least one delivery device can be operated in the rest mode per time segment, and this at least one delivery device therefore experiences no aging and no wear in this time segment, the service life of the delivery apparatus can be prolonged. The prolongation of the service life of the delivery apparatus corresponds at least to the proportion of time during which the delivery devices operate in the rest mode. However, if the delivery devices are serviced or exchanged in the respective time segments during which the respective delivery device is operated in the rest mode, the service life of the delivery apparatus can also be extended beyond that.

This is of particular interest especially when using piston pumps, since piston pumps normally have only a comparatively short service life on account of the high mechanical loads which occur during operation. After service life has expired, the piston pumps must then either be serviced or completely exchanged, which leads to frequent operating downtime of conventional gas turbine plants. By means of the method, the operating period of the delivery apparatus need no longer be limited by the maximum service life of the delivery devices.

Furthermore, in that time segment in which a delivery device is operated in the rest mode, this delivery device can be serviced or exchanged. It is therefore possible to operate the delivery apparatus in a lasting manner without having to interrupt the operation of the delivery apparatus for servicing individual delivery devices.

In a further expedient method, in the event of an unforeseen failure of one of the delivery devices, one of the delivery device groups to which the failed delivery device is not assigned can be switched to the active state. This makes it possible to continue operating the delivery apparatus without restrictions even in the event of failure of one or more delivery devices. In this way, in particular, impairment of the operation of the gas turbine plant can also be avoided in the event of failure of one or even more delivery devices.

The number of delivery device groups and the assignment of the delivery devices to the delivery device groups may also deviate from the embodiment shown in FIG. 1. For example, it is possible for only three delivery devices to be assigned to each delivery device group. The delivery device groups can then be activated individually one after the other in time segments. In order to increase the liquid mass flow delivered, however, it may then also be expedient to activate a plurality of delivery device groups together with the assigned delivery devices within a respective time segment. Alternatively, or even additionally, however, the delivery capacities of the delivery devices can also be increased in order to increase the liquid mass flow delivered.

Figure 2:
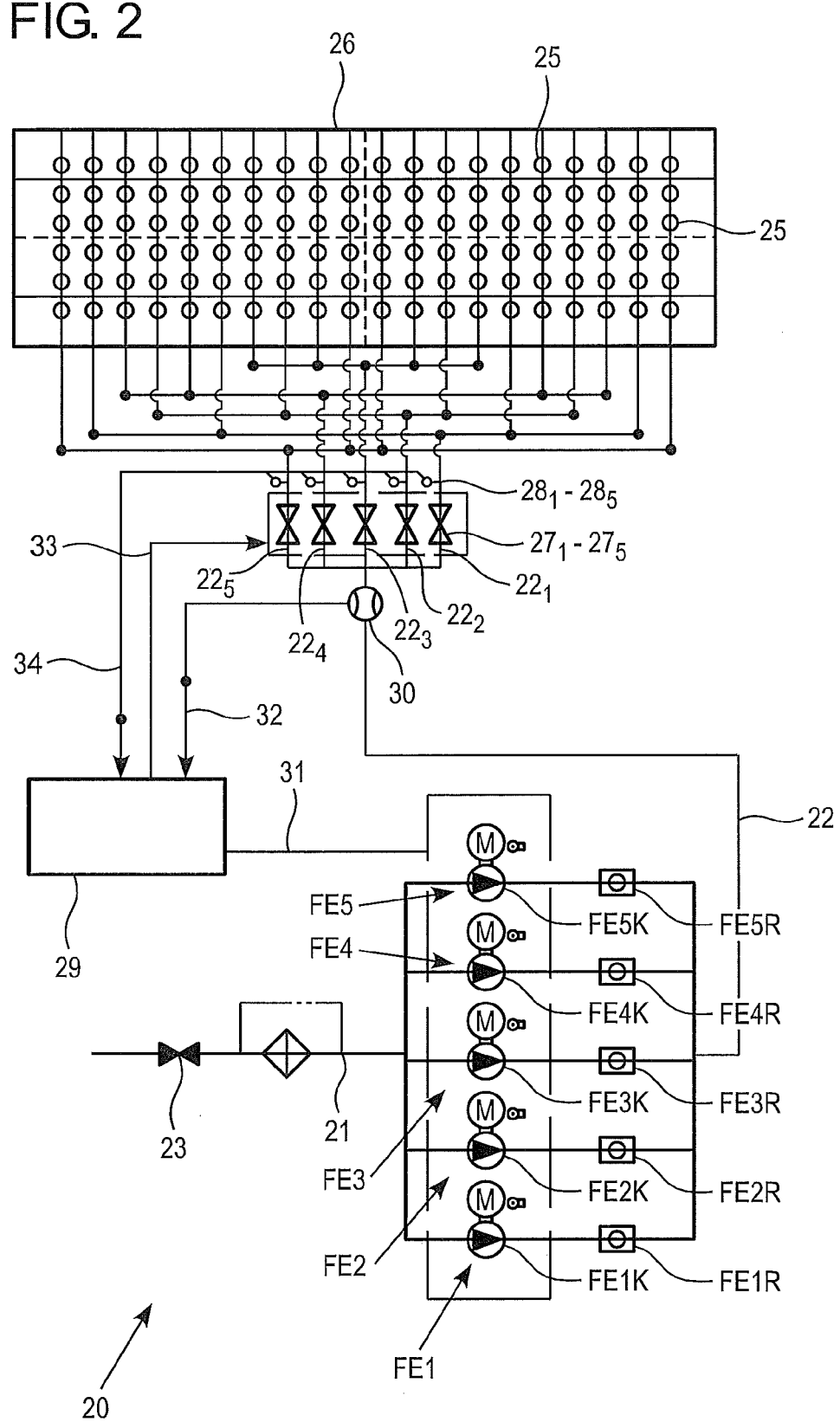
FIG. 2 shows a delivery apparatus designed according to the invention for use in a water injection system of a gas turboset.

FIG. 2 shows an exemplary delivery apparatus 20 for use in a water injection system of a gas turboset. The delivery apparatus 20 comprises a feed line 21, a delivery line 22 and five delivery devices FE1 to FE5 arranged parallel to one another for delivering a water mass flow from the feed line 21 into the delivery line 22. In order to connect each of the delivery devices FE1 to FE5 arranged parallel to one another to the feed line 21 and the delivery line 22, the feed line 21 and the delivery line 22 are each divided into five individual lines. Not shown in FIG. 2 is the fact that, for this purpose, the feed line 21, at the end remote from the delivery devices FE1 to FE5, is connected to a supply tank which holds demineralized water. Furthermore, a restrictor element 23 is provided in the feed line in order to regulate the feed.

The delivery line 22 in turn is connected to a multiplicity of atomizing elements. In the embodiment shown here, the atomizing elements are all arranged on a nozzle carrier 26. The atomizing elements used in the arrangement shown in FIG. 2 are pressure atomizer nozzles 25 which are combined to form groups in each case arranged in rows. To connect the delivery line to the pressure atomizer nozzles 25 arranged in groups, the delivery line 22 branches into individual delivery lines $22_1$, $22_2$, $22_3$, $22_4$ and $22_5$. Furthermore, restrictor elements, here electrically activated valves $27_1$, $27_2$, $27_3$, $27_4$ and $27_5$ are additionally arranged in the respective individual delivery lines $22_1$, $22_2$, $22_3$, $22_4$ and $22_5$. The nozzles combined into groups can be turned on and off in groups by means of the valves $27_1$, $27_2$, $27_3$, $27_4$ and $27_5$. The supply pressure applied to the nozzles in the individual delivery lines can also be individually regulated in this way. Furthermore, in the direction of flow downstream of the restrictor elements, respective pressure-measuring sensors $28_1$, $28_2$, $28_3$, $28_4$ and $28_5$ are arranged in the individual delivery lines $22_1$, $22_2$, $22_3$, $22_4$ and $22_5$, which pressure-measuring sensors $28_1$, $28_2$, $28_3$, $28_4$ and $28_5$ measure the liquid pressure in the individual delivery lines $22_1$, $22_2$, $22_3$, $22_4$ and $22_5$ and transmit it to a controller 29 of the delivery apparatus 20. Upstream of the point at which the delivery line 22 branches into the individual delivery lines $22_1$, $22_2$, $22_3$, $22_4$ and $22_5$, a mass-flow-measuring point 30 is additionally arranged here in the delivery line 22. In this way, the total mass flow in the delivery line 22 can be measured and transmitted to the controller 29.

Here, the delivery devices FE1 to FE5 each comprise an electrically driven piston pump FE1K to FE5K and a check valve FE1R to FE5R arranged downstream of the pump in the direction of flow.

Furthermore, the delivery apparatus can comprise a means for assigning the delivery devices to the delivery device groups and also means for the rolling activation of the delivery device groups together with the respectively assigned delivery devices in time segments. The means for assigning the delivery devices to the delivery device groups and for the rolling activation of the delivery device groups with the respectively assigned delivery devices in time segments comprise at least one storage element, a processor and input and output elements and are integrated in the controller in FIG. 2. The controller communicates via the data line 31 with the delivery devices and via the data lines 32, 33, 34 with the mass-flow-measuring point 30, the valves $27_1$ to $27_5$ and the pressure-measuring points $28_1$ to $28_5$.

The delivery apparatus designed shown in FIG. 2 can be expediently operated according to the method shown in FIG. 1. In a first method step, the means, integrated in the controller, for assigning the delivery devices assigns the piston pumps to the delivery device groups. This may be effected, for example, in such a way that a total of five delivery device groups are formed for every four delivery devices. The first delivery device group comprises the delivery devices FE1 to FE4, the second delivery device group comprises the delivery devices FE2 to FE5, etc. In a further method step, the actual delivery operation, the delivery device groups are then switched to the active state in a rolling manner in time segments by the means for the rolling activation of the delivery device groups in time segments.

This may be effected, for example, in such a way that the first delivery device group is activated from the rest mode for the first 500 operating hours, so that the water to be introduced into the main flow is delivered by means of the delivery devices FE1 to FE4. After the 500 operating hours have expired, the first delivery device group is deactivated, i.e. is switched into a standby mode. At the same time as the deactivation of the first delivery device group, the second delivery device group is switched to the active state. The delivery devices FE2 to FE5 of the second delivery device group then deliver in a time slot of 500 operating hours to 1000 operating hours of the delivery apparatus, etc. When the fifth delivery device group is deactivated, the first delivery device group is again activated and the cycle is started again.

Figure 3:
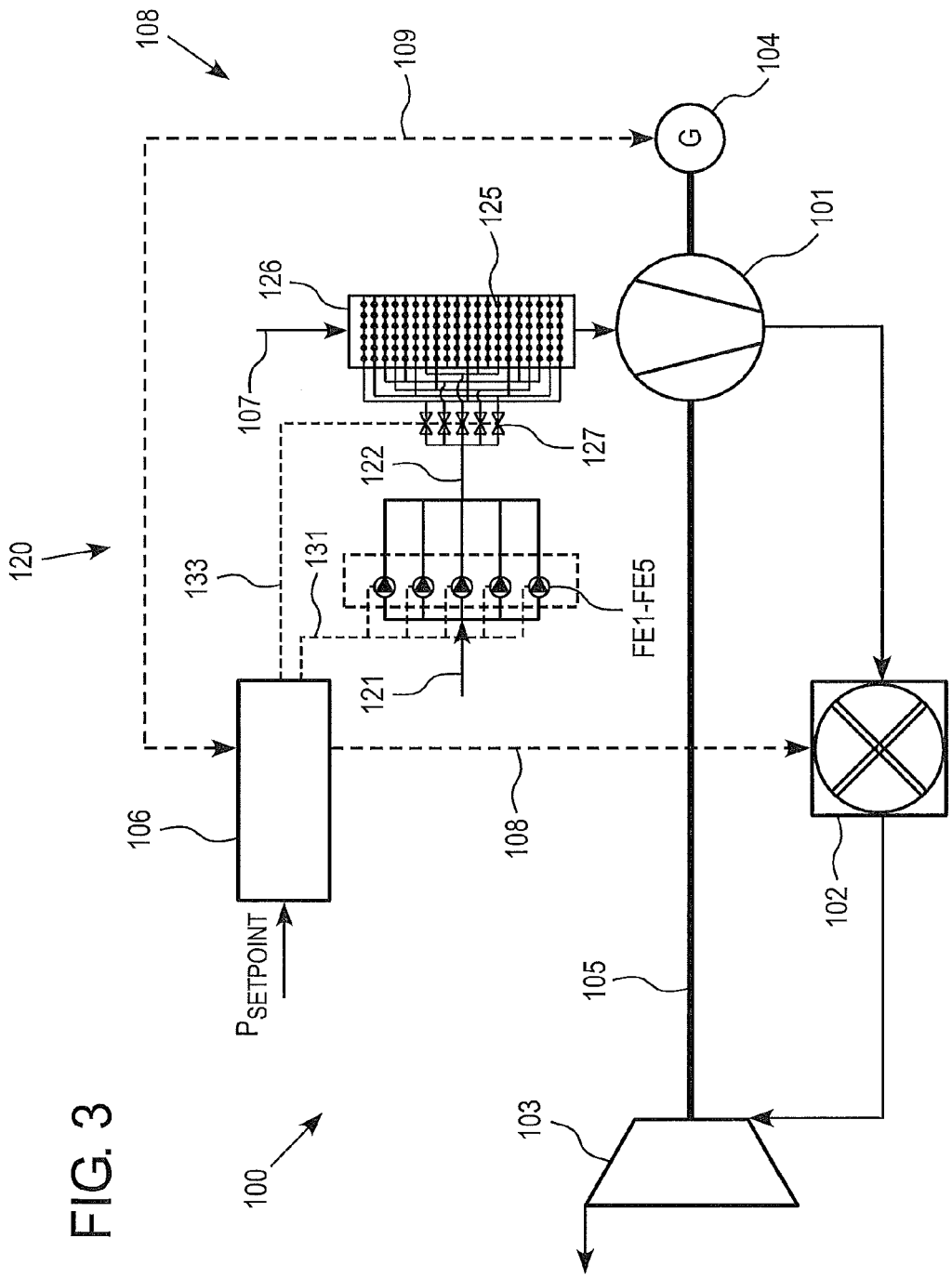
FIG. 3 shows a simplified illustration of a gas turbine having water injection.

Shown in FIG. 3 is a schematic illustration of a gas turbine 100, as is familiar to the person skilled in the art and often used, for example, for power generation or for stationary or mobile drives, such as aircraft drives for example. The gas turbine 100 shown by way of example comprises, as essential subassemblies, a compressor 101, a combustion chamber 102 and a turbine 103. Entering ambient air is compressed in the compressor 101 and fed to the combustion chamber 102. In the combustion chamber 102, fuel is admixed with the compressed air and the mixture is burned. In the turbine 103, the hot gas produced in the combustion chamber 102 is expanded to perform work, the turbine 103 of the stationary plant shown here also driving, in addition to the compressor 101, a power consumer, here a generator 104 for power generation, via the shaft 105. The turbine, compressor and generator are connected to one another via a shaft 105.

Furthermore, in order to increase the output of the gas turbine, a water injection apparatus 108 for introducing water into the inlet flow 107 of the compressor can be arranged here in the region of the compressor inlet. The water injection apparatus 108 comprises a delivery apparatus 120 as shown in FIG. 2. The delivery apparatus 120 comprises a feed line 121, a delivery line 122, five pumps FE1 to FE5, valves 127, and a nozzle carrier 126 having a multiplicity of individual nozzles 125. The individual nozzles 125 are each combined into groups and open into the inlet flow 107 of the compressor 101.

According to FIG. 3, the means for assigning the delivery devices and the means for the rolling activation of the delivery device groups with the respectively assigned delivery devices in time segments are integrated in the central gas turbine controller 106. A setpoint output selection $P_{setpoint}$ is preset as a setpoint value at the central controller 106. From the setpoint output selection $P_{setpoint}$, a fuel mass flow to be fed to the combustion chamber is calculated by the controller 106 and transmitted via the data line. Furthermore, the liquid mass flow which is to be introduced into the inlet flow 107 of the compressor 101 in order to increase the output of the gas turboset is determined from the setpoint output selection $P_{setpoint}$ by the central gas turbine controller. From this, the number of delivery device groups and/or the number of delivery devices per delivery device group and/or the assignment of the delivery devices to the delivery device groups can then be established as a function of the liquid mass flow to be delivered and transmitted via the data lines 131 and 133 to the pumps FE1 to FE5 and the valves 127. The further operation of the delivery apparatus 120 then corresponds to the embodiments with respect to FIG. 2.

Of course, it is also possible for the gas turbine shown in FIG. 3 to be of multi-shaft design having a plurality of turbines and combustion chambers arranged in between, having a plurality of compressors and coolers arranged in between, and the like. These embodiments are familiar to the person skilled in the art and exemplify a context relevant to the application, for which reason they are not described in any more detail at this point.

The method described in connection with FIG. 2 and the delivery apparatuses shown in FIGS. 2 and 3 represent exemplary embodiments which can be readily modified in a variety of ways by the person skilled in the art without thereby departing from the idea of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 to 15 Method step
16, 17 Method return
20 Delivery apparatus
21 Feed line
22 Delivery line
$22_1$ to $22_5$ Individual delivery line
23 Restrictor element
25 Nozzle
26 Nozzle carrier
$21_1$ to $27_5$ Valve
$28_1$ to $28_5$ Pressure-measuring sensor
29 Controller
30 Mass-flow-measuring point
31 Data line
32 Data line
33 Data line
34 Data line
100 Gas turboset
101 Compressor
102 Combustion chamber
103 Turbine
104 Generator
105 Shaft
106 Controller of the gas turbine
107 Inlet flow
108 Water injection apparatus
120 Delivery apparatus
121 Feed line
122 Delivery line
125 Nozzle
126 Nozzle carrier
127 Valve
131 Data line
133 Data line
FE1 to FE5 Delivery device
FE1K to FE5K Piston pump
FE1R to FE5R Check valve
$P_{SETPOINT}$ Setpoint output

What is claimed is:

1. A method of operating a delivery apparatus with which a liquid mass flow is continuously delivered in order to introduce the liquid mass flow into a main flow of a gas turboset, wherein the delivery apparatus includes a plurality of delivery devices connected parallel to one another, the method comprising:

assigning the delivery devices of the delivery apparatus to at least two delivery device groups; and switching the delivery device groups with their assigned delivery devices to an active state from a rest mode in a rolling manner in time segments to deliver the liquid mass flow, so that in each case at least one delivery device is operated in the rest mode in a rolling sequence per time segment, the liquid mass flow rate being the same in each case.

2. The method as claimed in claim 1, comprising:

switching the delivery device groups with their assigned delivery devices to the active state from the rest mode individually and/or in groups one after the other in each case at a start of a time segment in order to deliver the liquid mass flow, and switching to the rest mode again at an end of the time segment.

3. The method as claimed in claim 1, comprising:
selecting the time segments in a variable manner as a function of an individual load of the delivery device groups such that an identical overall load for all the delivery elements of the delivery device groups is achieved.

4. The method as claimed in claim 1, comprising:
establishing the number of delivery device groups and/or the number of delivery devices per delivery device group and/or the assignment of the delivery devices to the delivery device groups as a function of the liquid mass flow to be delivered.

5. The method as claimed in claim 1, comprising:
assigning at least one of the delivery devices to a plurality of delivery device groups.

6. The method as claimed in claim 1, wherein the delivery apparatus includes:
N delivery devices,
the N delivery devices of the delivery apparatus being assigned to N delivery device groups with, in each case, N−1 delivery devices.

7. The method as claimed in claim 1, comprising:
determining the liquid mass flow to be delivered from a setpoint output selection of the gas turboset.

8. The method as claimed in claim 1, comprising:
servicing or exchanging the delivery device which is in the rest mode or the delivery devices which are in the rest mode during the rest mode.

9. The method as claimed in claim 1, comprising:
switching a delivery device group to the active state in the event of an unforeseen failure of a delivery device, to which delivery device group the failed delivery device is not assigned.

10. A method according to claim 1, wherein the liquid mass flow is introduced to an inlet flow of a compressor of the gas turboset.

11. A delivery apparatus for the continuous delivery of a liquid mass flow in order to introduce the liquid mass flow into a main flow of a gas turboset, comprising:
a feed line,
a delivery line,
a plurality of delivery devices for delivering the liquid mass flow from the feed line into the delivery line;
at least one atomizing element communicating with the delivery line and delivering the liquid mass flow into the main flow of the gas turboset, the delivery devices being arranged parallel to one another;
a means for assigning the delivery devices to at least two delivery device groups; and
a means for rolling activation of the delivery device groups with the respectively assigned delivery devices in time segments, the liquid mass flow rate being the same in each case.

12. An apparatus according to 11, comprising:
an inlet flow of a compressor of a gas turboset for receiving the liquid mass flow.

13. The delivery apparatus as claimed in claim 12, wherein the means for assigning the delivery devices to the at least two delivery device groups and the means for the rolling activation of the delivery device groups with the respectively assigned delivery devices in time segments are integrated in a controller of the delivery apparatus.

14. A gas turboset, in combination with a delivery apparatus as claimed in claim 12, the at least one atomizing element communicating with the delivery line being arranged upstream of a compressor of the gas turboset.

* * * * *